United States Patent
Shin et al.

(10) Patent No.: US 11,674,861 B2
(45) Date of Patent: Jun. 13, 2023

(54) DEVICE AND METHOD FOR DETERMINING HANDS OFF BY DRIVER, AND METHOD FOR CONTROLLING VEHICLE USING THE SAME

(71) Applicants: Hyundai Motor Company, Seoul (KR); Kia Corporation, Seoul (KR)

(72) Inventors: Seok Young Shin, Gyeonggi-do (KR); Seung Ho Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/682,546

(22) Filed: Feb. 28, 2022

(65) Prior Publication Data
US 2023/0052279 A1  Feb. 16, 2023

(30) Foreign Application Priority Data
Aug. 13, 2021  (KR) .......... 10-2021-0107201

(51) Int. Cl.
*G01L 5/22* (2006.01)
*B60Q 9/00* (2006.01)

(52) U.S. Cl.
CPC ............. *G01L 5/221* (2013.01); *B60Q 9/00* (2013.01)

(58) Field of Classification Search
CPC .................... B60Q 9/00; G01L 5/221
See application file for complete search history.

(56) References Cited

U.S. PATENT DOCUMENTS

| | | | |
|---|---|---|---|
| 9,604,649 B1* | 3/2017 | Pastor | B62D 15/00 |
| 2013/0158771 A1* | 6/2013 | Kaufmann | B62D 6/00 701/1 |
| 2018/0172528 A1* | 6/2018 | Kim | B60W 50/14 |
| 2021/0162919 A1* | 6/2021 | Oesterwind | B62D 15/025 |

* cited by examiner

*Primary Examiner* — Omer S Khan
(74) *Attorney, Agent, or Firm* — Fox Rothschild LLP

(57) ABSTRACT

A device for determining hands off of a driver includes a torque sensor for sensing a torque caused by turning of a steering wheel and generating a torque signal, a first frequency filter and a second frequency filter for filtering the torque signal, a representative value generating device for generating a first representative value based on a frequency component of a first filtered signal output by the first frequency filter, and generating a second representative value based on a frequency component of a second filtered signal output by the second frequency filter, and a control module that determines the hands off of the driver based on a ratio of the first representative value and the second representative value.

14 Claims, 12 Drawing Sheets

(a)

(b)

DEVICE AND METHOD FOR DETERMINING HANDS OFF BY DRIVER, AND METHOD FOR CONTROLLING VEHICLE USING THE SAME

CROSS-REFERENCE TO RELATED APPLICATION

This application claims under 35 U.S.C. § 119(a) the benefit of Korean Patent Application No. 10-2021-0107201, filed in the Korean Intellectual Property Office on Aug. 13, 2021, the entire contents of which are incorporated herein by reference.

BACKGROUND

(a) Technical Field

The present disclosure relates to a device and a method for determining whether a driver's hands are off a steering wheel ("hands off" of a driver) in a vehicle, and a method for controlling the vehicle using the same.

(b) Description of the Related Art

Various dangerous situations may occur as the result of a driver's action or failure to take action in a traveling vehicle. For example, these dangerous situations include a situation in which the vehicle deviates from a current traveling line by inattentiveness of the driver, a situation in which a vehicle in a next lane is approaching excessively, a situation in which the driver is not gripping a steering wheel, a situation in which the driver is dozing, or the like.

To prevent such an emergency situation, technologies of determining whether the driver is gripping the steering wheel, and warning the driver based on sensing of hands off, which is a state in which hands of the driver are away from the steering wheel, are being proposed.

Because the conventional hands off determination method directly uses a sensed value obtained based on manipulation of the steering wheel, the conventional hands off determination method is vulnerable to noise, and has lowered accuracy of the hands off sensing result.

SUMMARY

An aspect of the present disclosure provides a device and a method for determining whether a driver's hands are off a steering wheel (hereinafter "hands off" of a driver) that may more accurately determine hands off.

Another aspect of the present disclosure provides a device and a method for determining hands off that may ensure safer vehicle operation based on more accurate hands off determination, and a method for controlling a vehicle using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for determining hands off of a driver includes a torque sensor for sensing a torque caused by turning of a steering wheel and generating a torque signal, a first frequency filter and a second frequency filter for filtering the torque signal, a representative value generating device for generating a first representative value based on a frequency component of a first filtered signal output by the first frequency filter, and generating a second representative value based on a frequency component of a second filtered signal output by the second frequency filter, and a control module that determines the hands off of the driver based on a ratio of the first representative value and the second representative value.

In one implementation, the first frequency filter may filter a first frequency region, and the second frequency filter may filter a second frequency region higher than the first frequency region.

In one implementation, at least one of the first frequency filter or the second frequency filter may be a band pass filter.

In one implementation, the representative value generating device may calculate one of a maximum value of a frequency amplitude, an average value of the frequency amplitude, or an absolute value of the frequency amplitude of the first filtered signal as the first representative value.

In one implementation, the representative value generating device may be a module for performing a Fast Fourier Transform (FFT).

In one implementation, the representative value generating device may obtain frequency amplitude data in a digital form, and obtain the first representative value based on sampling of the frequency amplitude data in a predetermined time unit.

In one implementation, the hands off determining device may determine the hands off of the driver based on a representative value ratio corresponding to a ratio of the second representative value to the first representative value being equal to or greater than a preset threshold.

In one implementation, the first frequency region and the second frequency region of the first frequency filter and the second frequency filter may be set such that the representative value ratio is equal to or greater than the preset threshold.

In one implementation, the control module may select the threshold from a lookup table of the threshold set differently based on a travel condition capable of causing a change in a magnitude of an external force applied to the steering wheel by the driver while the driver is gripping the steering wheel.

According to another aspect of the present disclosure, a method for determining hands off of a driver includes passing a torque signal generated by a torque sensor through a first frequency filter and a second frequency filter to obtain a first filtered signal and a second filtered signal, respectively, generating a first representative value and a second representative value from the first filtered signal and the second filtered signal, respectively, and determining the hands off of the driver based on a ratio of the first representative value and the second representative value.

In one implementation, the obtaining of the first filtered signal and the second filtered signal may include receiving a physical quantity proportional to turning of a steering wheel as the torque signal.

In one implementation, the obtaining of the first filtered signal and the second filtered signal may include using the first frequency filter for filtering a first frequency region, and the second frequency filter for filtering a second frequency region higher than the first frequency region.

In one implementation, the obtaining of the first filtered signal and the second filtered signal may include using a band pass filter.

In one implementation, the generating of the first representative value and the second representative value may include generating the first representative value using one of a maximum value of a frequency amplitude, an average value of the frequency amplitude, or an absolute value of the frequency amplitude of the first filtered signal.

In one implementation, the generating of the first representative value and the second representative value may further include performing a Fast Fourier Transform (FFT) on the frequency amplitude of the first filtered signal.

In one implementation, the generating of the first representative value and the second representative value may include obtaining frequency amplitude data in a digital form from the first filtered signal, and generating the first representative value based on sampling of the frequency amplitude data in a predetermined time unit.

In one implementation, the determining of the hands off of the driver may include determining the hands off of the driver based on a representative value ratio corresponding to a ratio of the second representative value to the first representative value being equal to or greater than a preset threshold.

In one implementation, the determining of the hands off of the driver may include setting the first frequency region and the second frequency region such that the representative value ratio is equal to or greater than the preset threshold.

In one implementation, the determining of the hands off of the driver may include setting the threshold differently based on a travel condition capable of causing a change in a magnitude of an external force applied to a steering wheel by the driver while the driver is gripping the steering wheel.

According to another aspect of the present disclosure, a method for controlling a vehicle includes passing a torque signal generated by turning of a steering wheel of the vehicle through a first frequency filter and a second frequency filter to obtain a first filtered signal and a second filtered signal, respectively, generating a first representative value and a second representative value from the first filtered signal and the second filtered signal, respectively, determining a hands off of a driver based on a ratio of the first representative value and the second representative value, and transmitting an alarm based on identification of the hands off of the driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
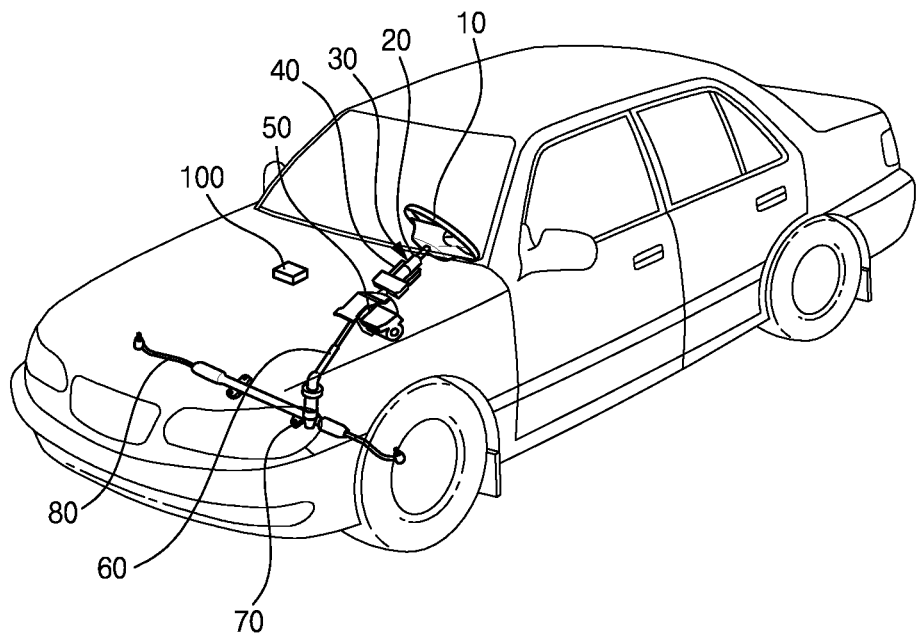
FIG. 1 is a view showing a steering system of a vehicle including a hands off sensing device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 12.

FIG. 1 is a view showing a steering system of a vehicle including a hands off sensing device according to an embodiment of the present disclosure.

A steering system of a vehicle may include a steering wheel 10, a torque sensor 20, a torsion bar 30, a steering column 40, a motor 50, a steering shaft 60, a steering gearbox 70, an arm 80, and a control module 100. The steering wheel 10 may turn in response to manipulation of a driver, and the torsion bar 30 may include the torque sensor 20 that senses the turning of the steering wheel 10.

The steering column 40 may be coupled to the motor 50, the motor 50 may provide an assist torque in proportion to the turning of the steering wheel 10.

The assist torque generated by the motor 50 may be transmitted to the arm 80 through the steering shaft 60 and the steering gearbox 70.

The control module 100 may control the torque of the motor 50 based on a vehicle speed, a torque signal obtained from the torque sensor, and the like. The control module 100 may include a motor driven power steering (MDPS). In particular, the control module 100 may include a hands off sensing device for determining whether hands of the driver are off the steering wheel 10.

The hands off sensing device may determine the hands off of the driver based on the torque signal. The torque signal, which is a physical quantity obtained by the torque sensor 20, may be a signal proportional to the turning of the steering wheel 10.

The torque sensor 20 may sense the turning of the steering wheel 10 with a magnetic scheme or an optical scheme, and may generate the torque signal based on the sensed turning.

A torque sensor of the magnetic scheme may generate the torque signal based on a deviation of a rotation amount of an input column and an output column of the steering column 40 resulted from the turning of the steering wheel 10. In particular, the input column may rotate based on the turning of the steering wheel 10. As the input column rotates, the torsion bar may be twisted and the output column may rotate. During the rotation of the steering column 40, because a road surface fiction force of a wheel is transmitted to the output column, the input column may rotate more than the output column. An opposing area of a first detection ring coupled to the input column and a second detection ring coupled to the torsion bar may hardly change. In contrast, an opposing area of the second detection ring and a third detection ring coupled to the output column may be changed by a difference in the rotation between the input column and the output column, and inductance values of a first coil disposed in the second detection ring and a second coil disposed in the third detection ring may be changed. The control module 100 may measure a turning deviation of the steering wheel and the wheel by measuring a change in the inductance value of the first coil with respect to the inductance value of the second coil.

A torque sensor of the optical scheme may be coupled such that each of an input disk and an output disk is coupled to each of the input column and the output column to face thereto. A light emitting element and a light receiving element may be respectively disposed above and below the input disk and the output disk, and the light receiving element may receive light passed through the input disk and the output disk from the light emitting element. When a rotation angle of the input disk and the output disk is changed based on the turning of the steering wheel 10, an amount of light received by the light receiving element may also change. The control module 100 may measure the turning deviation of the steering wheel 10 and the wheel based on the amount of light received by the light receiving element.

A configuration and an operation of the hands off sensing device are as follows.

Figure 2:
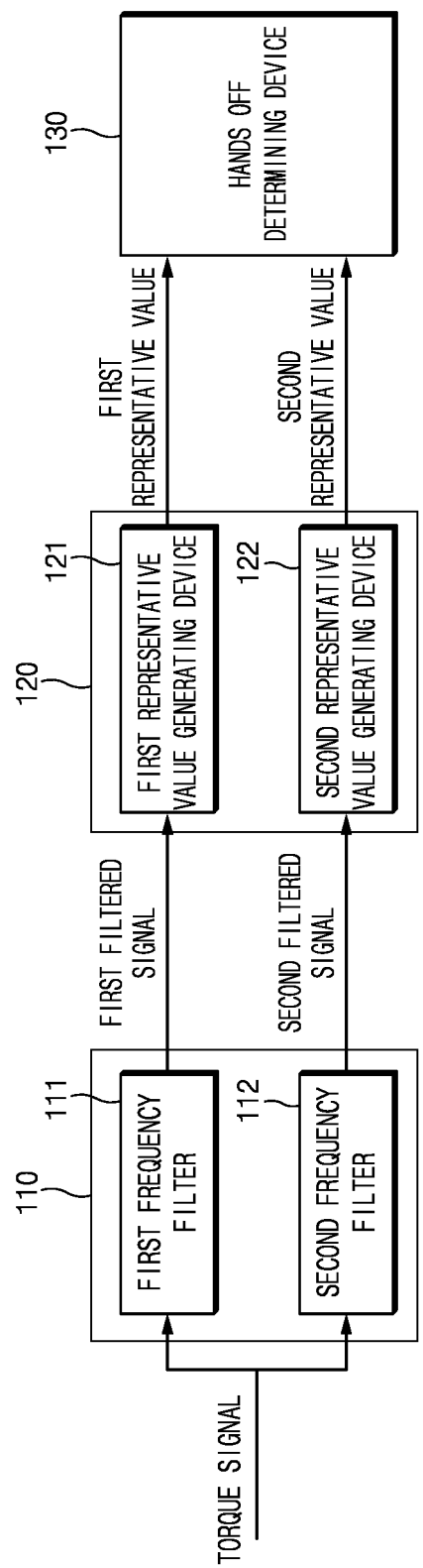
FIG. 2 is a block diagram showing a configuration of a hands off sensing device according to an embodiment of the present disclosure.
Figure 3:
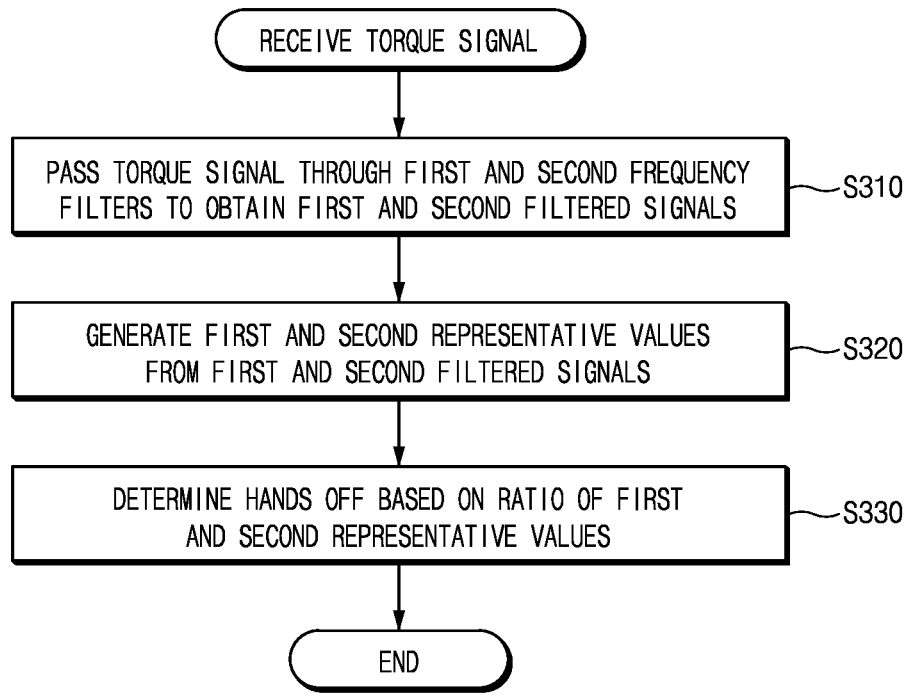
FIG. 3 is a flowchart illustrating a hands off sensing method using a hands off sensing device.

FIG. 2 is a block diagram showing a configuration of a hands off sensing device according to an embodiment of the present disclosure. FIG. 3 is a flowchart illustrating a hands off sensing method using a hands off sensing device.

Referring to FIG. 2, the hands off sensing device according to an embodiment of the present disclosure may include a frequency filter 110, a representative value generating device 120, and a hands off determining device 130. The frequency filter 110 may include a first frequency filter 111 and a second frequency filter 112, and the representative value generating device 120 may include a first representative value generating device 121 and a second representative value generating device 122.

The hands off sensing method according to an embodiment of the present disclosure will be described as follows with reference to FIGS. 2 and 3.

In a first operation (S310), the first frequency filter 111 may receive the torque signal, filter a first frequency region from the torque signal, and output a first filtered signal. The first frequency filter 111 may provide the first filtered signal to the first representative value generating device 121.

Similarly, the second frequency filter 112 may generate a second filtered signal by filtering a second frequency region from the received torque signal, and transmit the second filtered signal to the second representative value generating device 122. The second frequency filter 112 may filter a frequency band different from that of the first frequency filter 111. Hereinafter, in the present specification, an embodiment in which the second frequency filter 112 filters a higher frequency band than the first frequency filter 111 will be mainly described.

In a second operation (S320), the first representative value generating device 121 generates a first representative value based on the first filtered signal provided from the first frequency filter 111. To this end, the first representative value generating device 121 may include a Fast Fourier Transform (FFT) module. The FFT module may perform a fast Fourier transform on the first filtered signal and obtain frequency amplitude data in a digital form.

The first representative value generating device 121 may sample the frequency amplitude data in a predetermined time unit, and may generate the first representative value based on the sampling. For example, the first representative value generating device 121 may set a maximum value of the frequency amplitude data in a sampling period as the first representative value. Alternatively, the first representative value generating device 121 may set an average value of the frequency amplitude data in the sampling period as the first representative value. Alternatively, the first representative value generating device 121 may set an absolute value of the frequency amplitude data in the sampling period as the first representative value.

The first representative value generating device 121 may provide the first representative value to the hands off determining device 130.

Similarly, the second representative value generating device 122 may generate a second representative value based on the second filtered signal provided from the second frequency filter 112, and provide the second representative value to the hands off determining device 130.

In a third operation (S330), the hands off determining device 130 may determine whether the hands are off based on the first representative value and the second representative value.

The hands off determining device 130 may determine whether the hands are off based on a representative value ratio. The representative value ratio corresponds to a ratio of the first representative value and the second representative value. In the present specification, an embodiment in which a quotient obtained by dividing the second representative value by the first representative value is set as the representative value ratio will be mainly described.

When the ratio of the first representative value and the second representative value is equal to or lower than a preset threshold, the hands off determining device 130 may determine that the driver is in the hands off state of not gripping the steering wheel 10.

Figure 4:
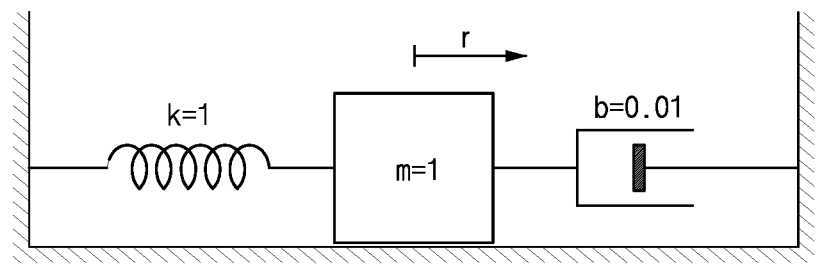
FIG. 4 is a view showing a one degree of freedom system.
Figure 5:
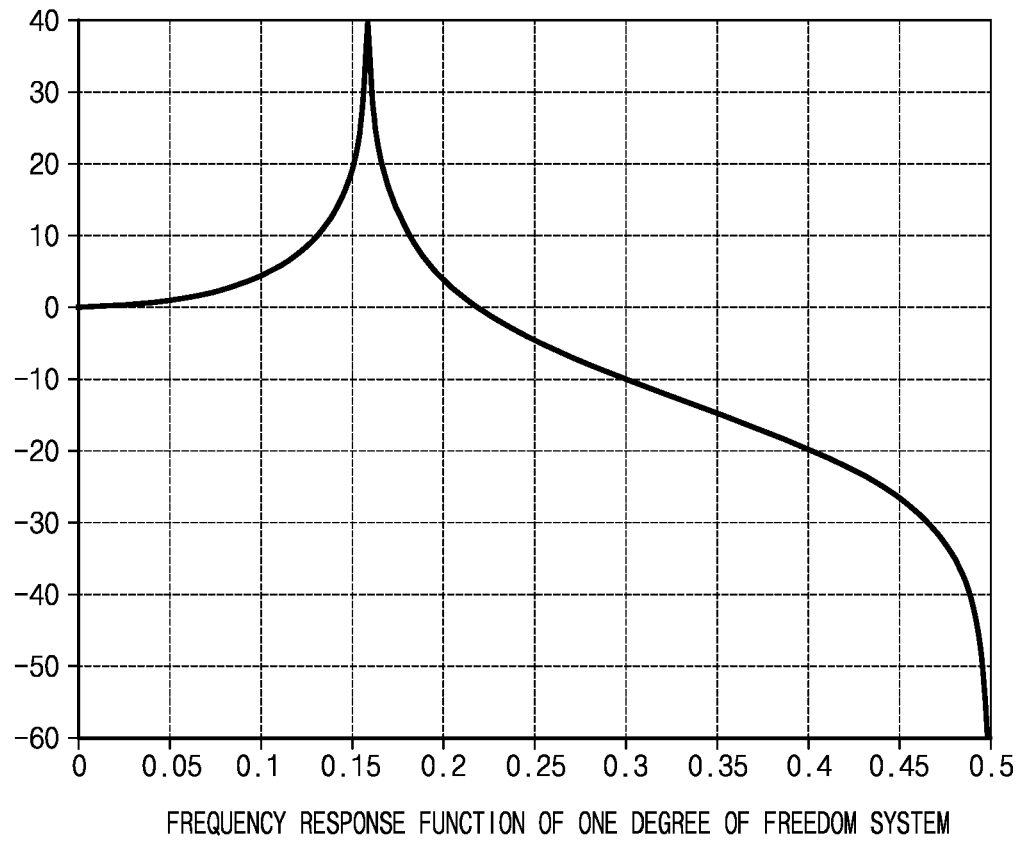
FIG. 5 is a view showing a frequency response function of the one degree of freedom system.

FIGS. 4 and 5 are views for illustrating a principle of the hands off sensing method according to an embodiment of the present disclosure. FIG. 4 is a view showing a one degree of freedom system, and FIG. 5 is a view showing a frequency response function of a one degree of freedom system.

Referring to FIGS. 4 and 5, a one degree of freedom system may continue to vibrate with the same amplitude without receiving a resistance by initial energy or displacement. The one degree of freedom system may have a natural frequency that is affected by a mass m, a stiffness k, and a damping b. In addition, when a configuration of the degree of freedom system is changed, a frequency characteristic may be changed.

For example, the frequency characteristic of the vehicle steering system may be changed depending on a hands on state or the hands off state of the driver. The change in the frequency characteristics depending on whether the driver is gripping the steering wheel is as follows.

Figure 6:
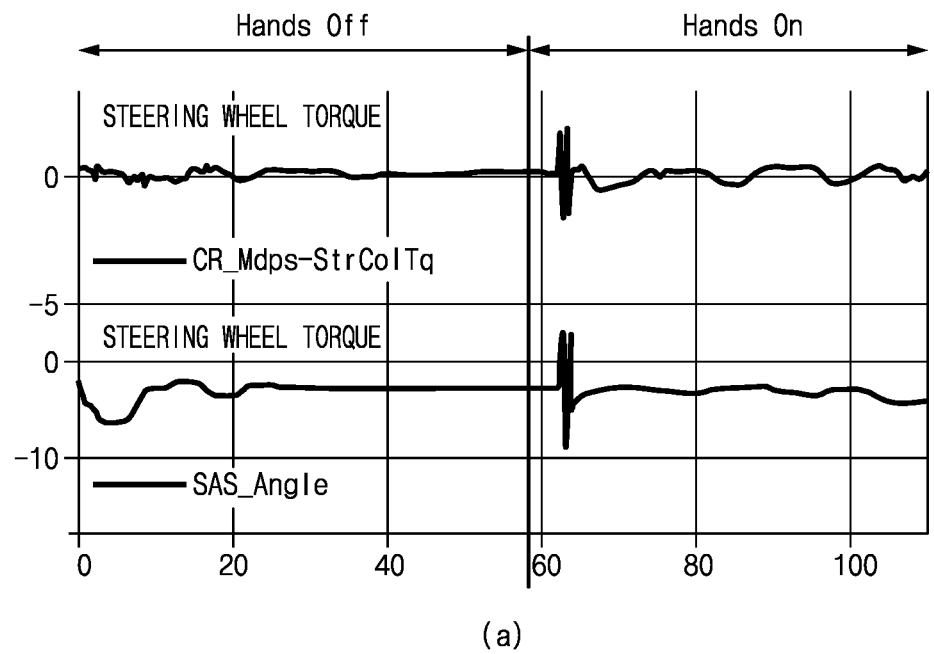
FIG. 6 is a view showing a change in a physical quantity involved in a steering system based on a hands off state or a hands on state.
Figure 6:
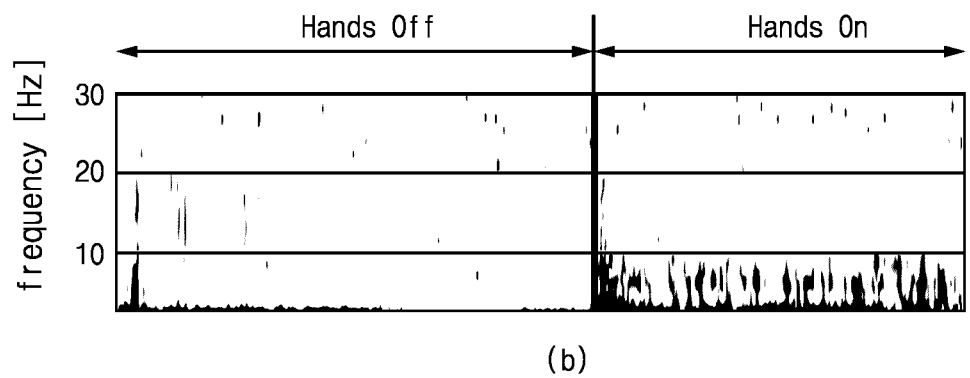

FIG. 6 is a view showing a change in a physical quantity involved in a steering system based on a hands off state or a hands on state.

Referring to (a) in FIG. 6, a steering wheel torque and a steering wheel angle change based on the hands on state or the hands off state, but a difference in a change amount is negligible. Therefore, reliability may be reduced when whether the hands are off is determined simply based on a change in a magnitude of the steering wheel torque.

On the other hand, as in (b) in FIG. 6, it may be seen that output of the FFT representing the frequency characteristic changes greatly based on the hands off state or the hands on state.

That is, because the hands off sensing method according to the embodiment of the present disclosure reflects the frequency characteristic, it is possible to increase the reliability of determining whether the hands are off.

In addition, the hands off determining device 130 according to the embodiment of the present disclosure may increase the reliability of the hands off determination using the first frequency filter and the second frequency filter.

Figure 7:
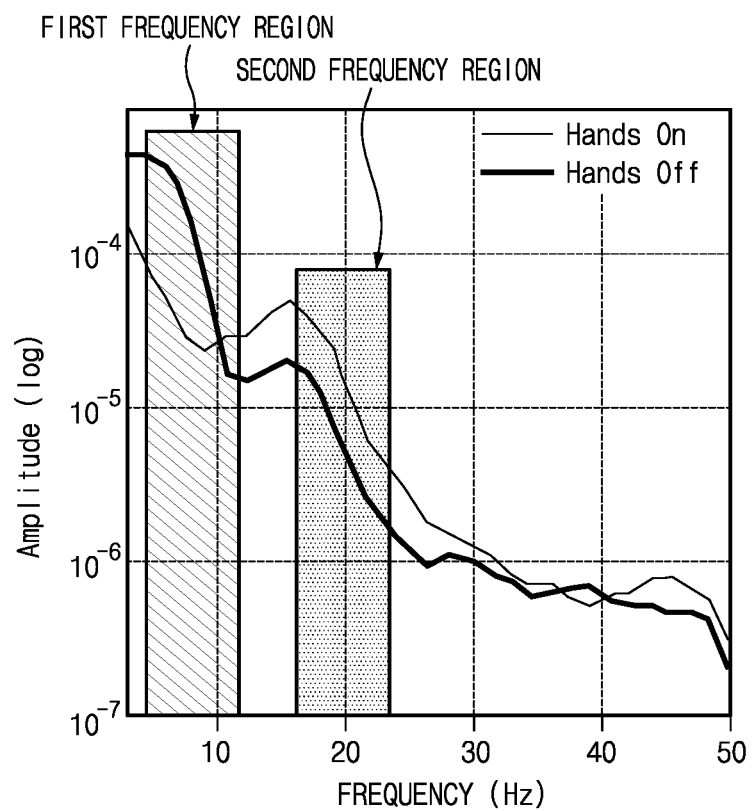
FIG. 7 is a view showing a frequency component of a torque signal based on a hands off state or a hands on state.

FIG. 7 is a view showing a frequency component of a torque signal based on a hands off state or a hands on state.

Referring to FIG. 7, the frequency component of the torque signal may include a frequency and an amplitude corresponding to the frequency. It may be seen that, in the hands off state and the hands on state, tendencies of the amplitude to change based on the frequency are similar, but ratios of change of the amplitude based on the frequency are different. In particular, it may be seen that the ratios of the amplitude corresponding to the frequency are very different in a section equal to or lower than about 10 Hz and a section of about 20 Hz. It may be seen that, while a frequency amplitude in the hands on state is lower than a frequency amplitude in the hands off state in the section equal to or lower than about 10 Hz, the frequency amplitude in the hands on state is higher than the frequency amplitude in the hands off state in the section of about 20 Hz.

The frequency component of the torque signal shown in FIG. 7 may be obtained based on an experimental result.

Because the hands off determining device 130 determines the hands off based on the ratio of the first representative value to the second representative value, the greater the difference between the first representative value and the second representative value, the higher the reliability of the hands off determination.

Therefore, the first frequency filter 111 and the second frequency filter 112 according to an embodiment of the present disclosure may be selected in a frequency range that causes the ratio of the first representative value to the second representative value to be large in the frequency component of the torque signal. To this end, a threshold ratio may be preset, and the frequency regions of the first and second frequency filters 111 and 112 may be set such that the representative value ratio is equal to or greater than the threshold ratio.

For example, to filter the torque signal representing the frequency component as shown in FIG. 7, the first frequency filter 111 may use a bandpass filter that filters a frequency band having a center frequency of about 8 Hz, and the second frequency filter 112 may use a bandpass filter that filters a frequency band having a center frequency of about 20 Hz.

Figure 8:
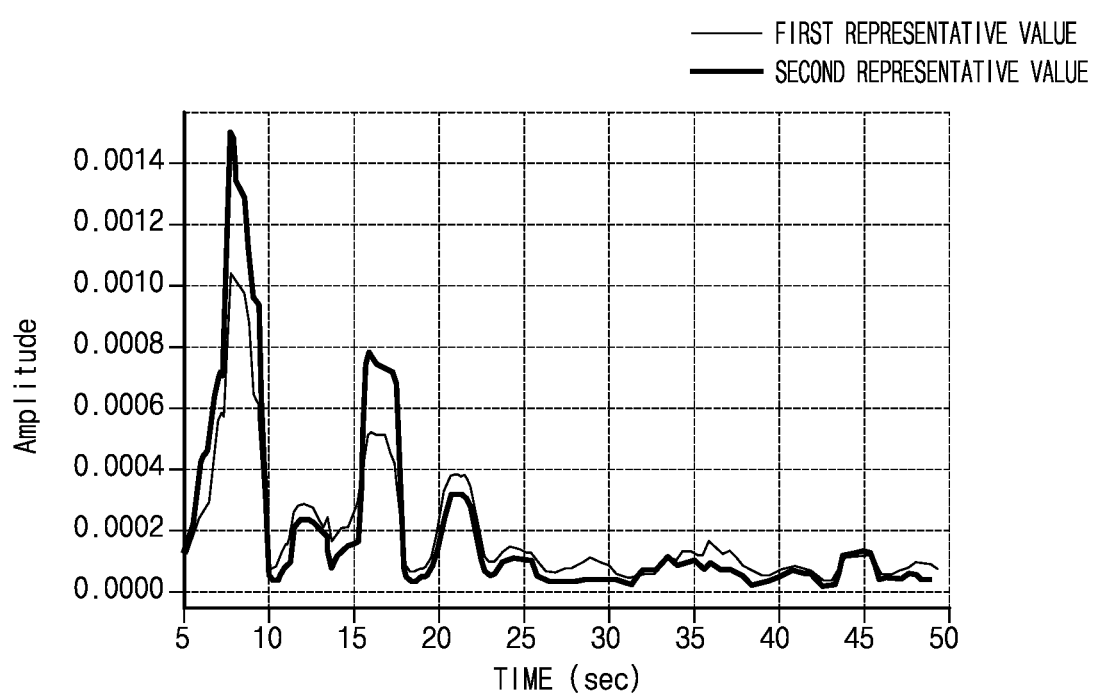
FIG. 8 is a view showing that a first representative value and a second representative value of a frequency change with time in a hands on state.
Figure 9:
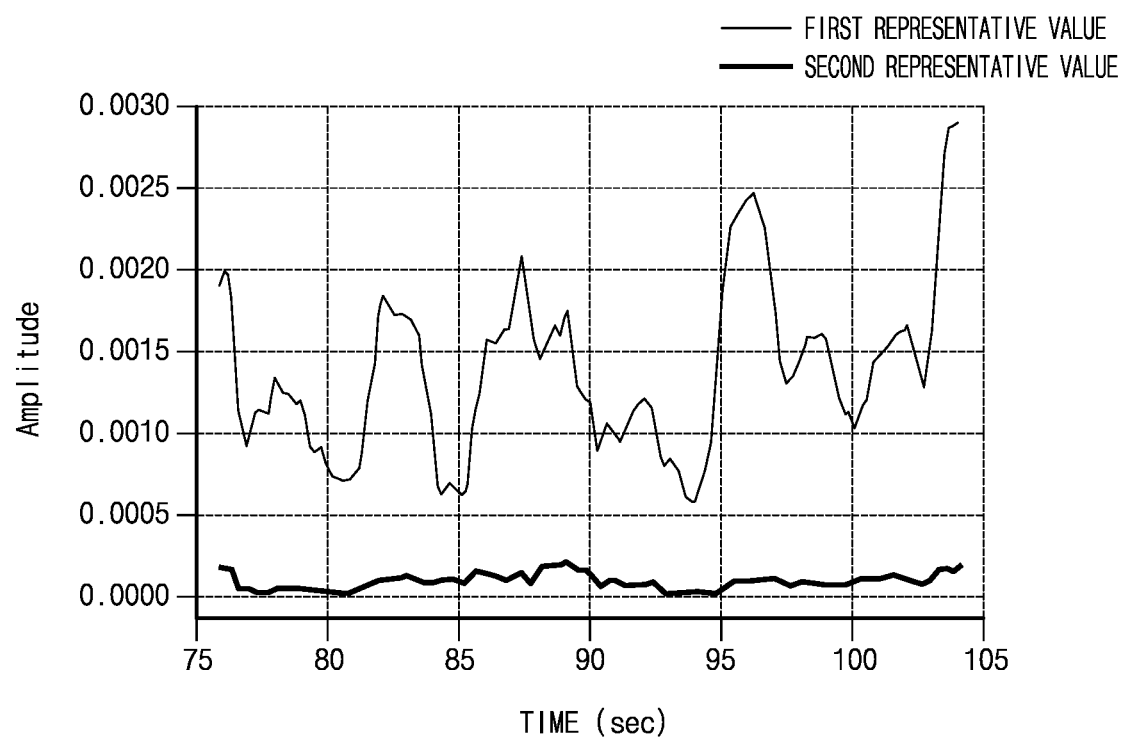
FIG. 9 is a view showing that a first representative value and a second representative value change with time in a hands off state.
Figure 10:
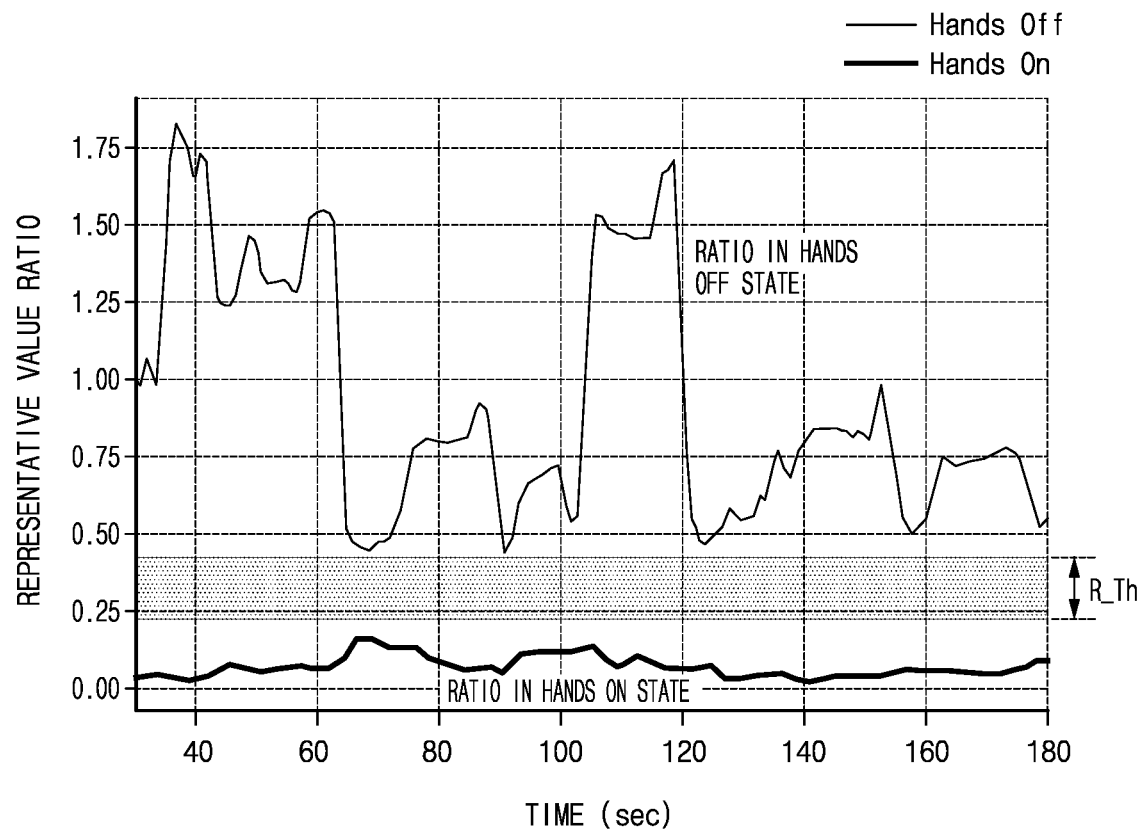
FIG. 10 is a view showing that a ratio of a first representative value to a second representative value changes with time.

FIGS. 8 to 10 are views for illustrating a hands off determining method.

FIG. 8 is a view showing that a first representative value and a second representative value of a frequency change with time in a hands on state. FIG. 9 is a view showing that a first representative value and a second representative value change with time in a hands off state. FIG. 10 is a view showing that a ratio of a first representative value to a second representative value changes with time.

Referring to FIG. 8, it may be seen that the change of the first representative value and the change of the second representative value are similar in the hands on state. That is, in the hands on state, a difference in an amplitude between the first representative value and the second representative value is not great.

Referring to FIG. 9, in the hands off state, the first representative value changes greatly with time, whereas the second representative value does not show a significant change with time.

That is, as in FIG. 10, it may be seen that the representative value ratio in the hands off state is greater than the representative value ratio in the hands on state. In FIG. 10, the representative value ratio may be obtained by the quotient obtained by dividing the second representative value by the first representative value.

The hands off determining device 130 may determine that the hands are off based on the representative value ratio being equal to or higher than the threshold.

Referring to FIG. 10, the threshold may be set to have a magnitude that may distinguish the hands on state and the hands off state based on the representative value ratio. To set the threshold, the representative value ratio in the hands on state and the representative value ratio in the hands off state may be obtained in advance. In addition, the threshold may be set in a range R_Th that is greater than a maximum value of the representative value ratio in the hands on state and smaller than a minimum value of the representative value ratio in the hands off state.

In addition, the threshold may be set differently depending on a travel condition. The travel condition may mean a condition that may cause a change in a magnitude of an external force applied to the steering wheel 10 by the grip of the driver. For example, the force of the driver gripping the steering wheel 10 may change depending on a curvature of the vehicle and the vehicle speed based on the turning of the steering wheel 10. When the force of the driver gripping the steering wheel 10 changes, a kinematic system of the steering system may also change. To reflect the same, the threshold may be set to vary depending on at least one of the curvature and/or the speed. In addition, the threshold based on the travel condition may be stored in a form of a look-up table.

[Table 1] is a table showing a look-up table of the threshold reflecting both the curvature and the speed.

TABLE 1

|  |  | Speed | | |
| --- | --- | --- | --- | --- |
|  |  | Equal to or lower than 40 | Between 40 and 60 | Equal to or higher than 80 |
| Curvature | 0 | First threshold | Second threshold | Third threshold |
|  | 0~0.002 | Second threshold | Third threshold | Fourth threshold |
|  | 0.002~0.008 | Third threshold | Fourth threshold | Fifth threshold |

Referring to [Table 1], the control module 100 according to an embodiment of the present disclosure may identify the travel condition and select the threshold based on the travel condition. The first representative value and the second representative value should be distinguishable by the threshold. When the selection of the first frequency filter 111 and the second frequency filter 112 is not appropriate, the first representative value and the second representative value may not be distinguished by the threshold.

Figure 11:
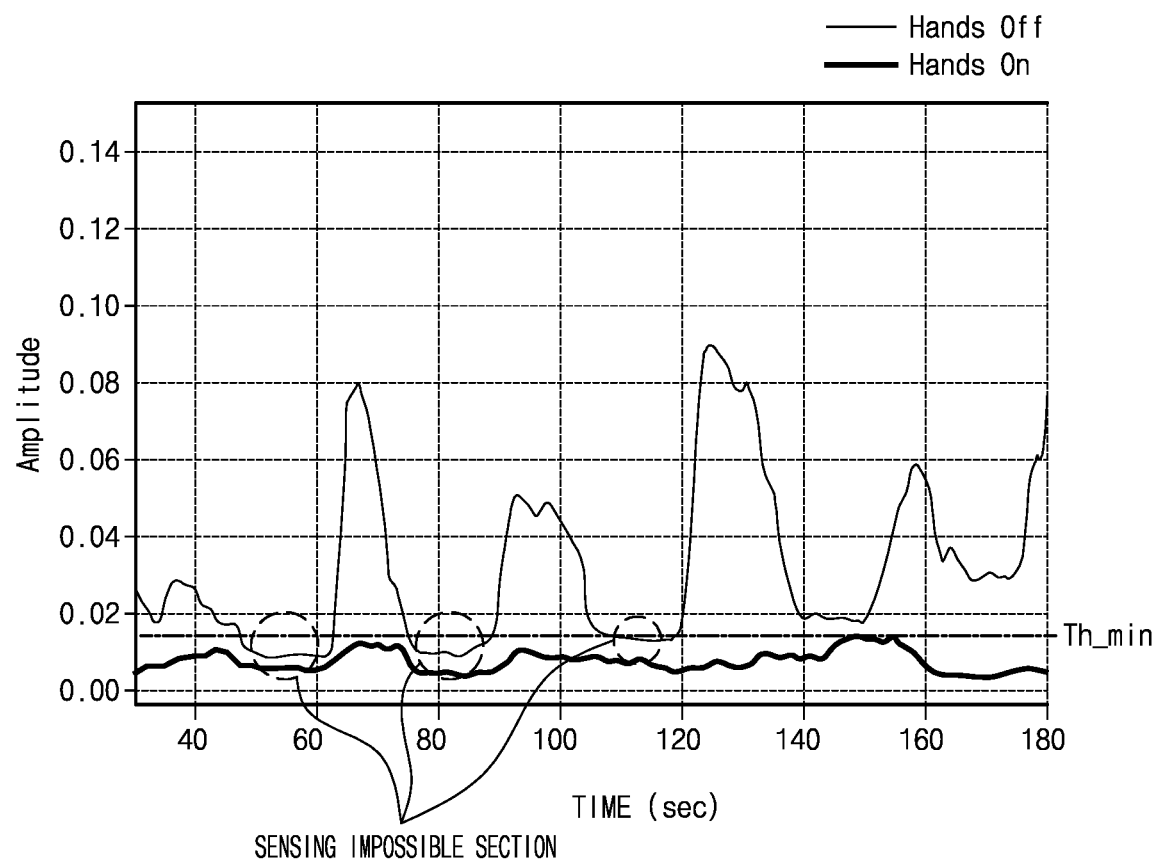
FIG. 11 is a view showing a representative value ratio according to Comparative Example.

FIG. 11, which is a view showing a representative value ratio according to Comparative Example, illustrates a case in which selection of a first frequency filter and a second frequency filter is not appropriate.

Referring to FIG. 11, because the threshold should be set to be greater than the representative value ratio in the hands on state, a minimum magnitude of the threshold may be "Th_min". Even when the threshold is set to have the minimum magnitude, there may be a sensing impossible section corresponding to a section in which the representative value is smaller than the threshold in the hands off state.

Therefore, the first frequency filter 111 and the second frequency filter 112 may be selected such that the representative value ratios may be distinguished based on an arbitrary magnitude.

According to an embodiment of the present disclosure, the control module 100 may control a driving device of the vehicle based on the hands off sensing.

According to an embodiment, the control module 100 may transmit an alarm to the driver based on the hands off sensing.

According to another embodiment, the control module 100 may determine whether the vehicle has deviated a line based on the hands off sensing, and control the steering system based on the determination that the line deviation has occurred.

Figure 12:
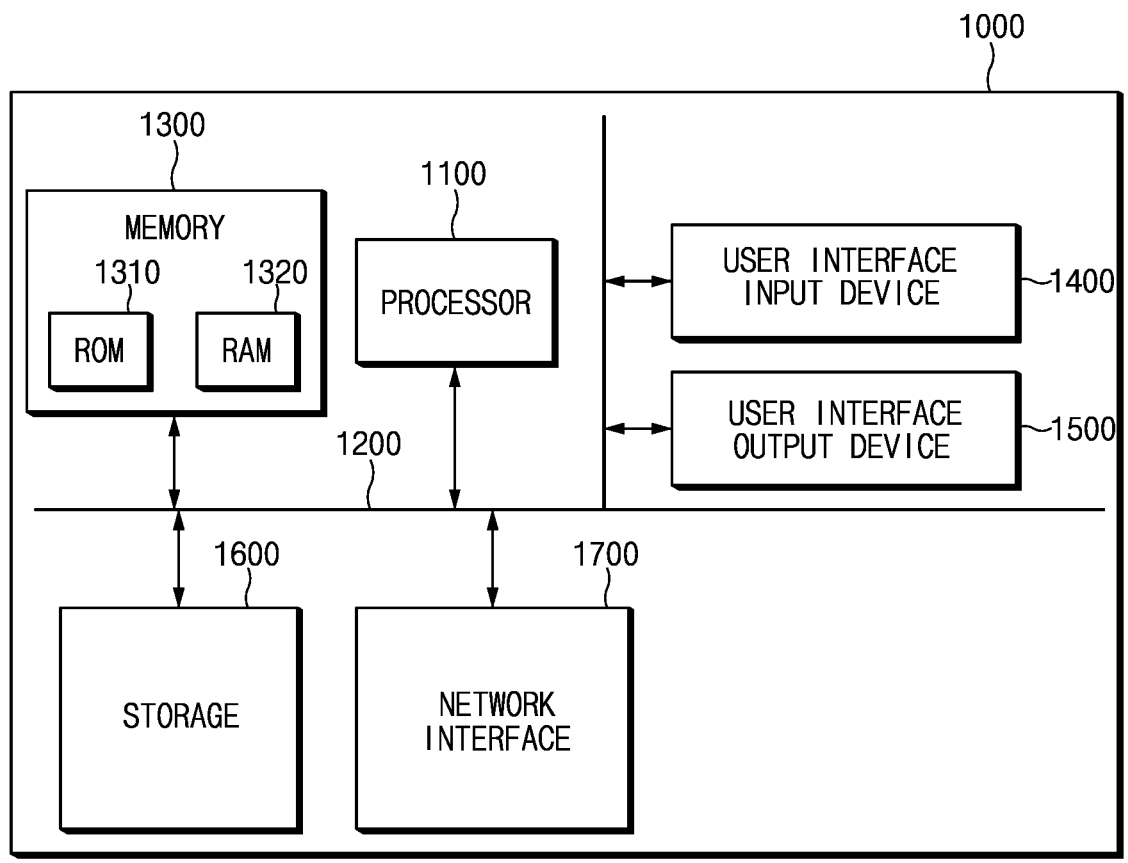
FIG. 12 shows a computing system according to an embodiment of the present disclosure.

FIG. 12 shows a computing system according to an embodiment of the present disclosure.

With reference to FIG. 12, a computing system 1000 may include at least one processor 1100, a memory 1300, a user interface input device 1400, a user interface output device 1500, storage 1600, and a network interface 1700 connected via a bus 1200. The control module according to the embodiment of the present disclosure may be implemented as a component of the processor 1100.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the hands off may be more accurately determined using the change in the frequency component occurred by the external force applied to the steering wheel.

In addition, according to the present disclosure, because the hands off is determined based on the ratios of the different frequency regions, the reliability of the hands off determination may be improved.

In addition, according to the present disclosure, safer travel may be provided by controlling the vehicle based on the more accurate hands off determination.

In addition, various effects directly or indirectly identified through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for determining hands off of a driver, the device comprising:
    a torque sensor for sensing a torque caused by turning of a steering wheel and generating a torque signal;
    a first frequency filter and a second frequency filter for independently filtering the torque signal;
    a representative value generating device for generating a first representative value based on a frequency component of a first filtered signal output by the first frequency filter, and generating a second representative value based on a frequency component of a second filtered signal output by the second frequency filter; and
    wherein the first frequency filter is configured to filter a first frequency region and the second frequency filter is configured to filter a second frequency region higher than the first frequency region;
    wherein the representative value generating device calculates one of a maximum value of a frequency amplitude, an average value of the frequency amplitude, or an absolute value of the frequency amplitude of the first filtered signal as the first representative value and the second filtered signal as the second representative value;
    a control module configured to determine the hands off of the driver based on a representative value ratio corresponding to a ratio of the first representative value and the second representative value being equal to or greater than a preset threshold;
    wherein the hands off determining device determines the hands off of the driver based on a representative value ratio corresponding to a ratio of the second representative value to the first representative value being equal to or greater than a preset threshold.

2. The device of claim 1, wherein at least one of the first frequency filter or the second frequency filter is a band pass filter.

3. The device of claim 1, wherein the representative value generating device is a module for performing a Fast Fourier Transform (FFT).

4. The device of claim 3, wherein the representative value generating device obtains frequency amplitude data in a digital form, and obtains the first representative value based on sampling of the frequency amplitude data in a predetermined time unit.

5. The device of claim 1, wherein the first frequency region and the second frequency region of the first frequency filter and the second frequency filter are set such that the representative value ratio is equal to or greater than the preset threshold.

6. The device of claim 3, wherein the control module is configured to select the threshold from a threshold lookup table set differently based on a travel condition capable of causing a change in a magnitude of an external force applied to the steering wheel by the driver while the driver is gripping the steering wheel.

7. A method for determining hands off of a driver, the method comprising:
    passing a torque signal generated by a torque sensor, independently through a first frequency filter and a second frequency filter, to obtain a first filtered signal and a second filtered signal, respectively;
    wherein obtaining the first filtered signal and the second filtered signal includes:
        using the first frequency filter for filtering a first frequency region, and the second frequency filter for filtering a second frequency region higher than the first frequency region;
    generating a first representative value and a second representative value from the first filtered signal and the second filtered signal, respectively;
    wherein generating the first representative value and the second representative value includes:
        generating the first representative value using one of a maximum value of a frequency amplitude, an average value of the frequency amplitude, or an absolute value of the frequency amplitude of the first filtered signal;
    and
    determining the hands off of the driver based on a representative value ratio corresponding to a ratio of the first representative value and the second representative value being equal to or greater than a preset threshold.

8. The method of claim 7, wherein obtaining the first filtered signal and the second filtered signal includes:
    receiving a physical quantity proportional to turning of a steering wheel as the torque signal.

9. The method of claim 7, wherein obtaining the first filtered signal and the second filtered signal includes: using a band pass filter.

10. The method of claim 7, wherein generating the first representative value and the second representative value further includes: performing a Fast Fourier Transform (FFT) on the frequency amplitude of the first filtered signal.

11. The method of claim 10, wherein generating the first representative value and the second representative value includes:
    obtaining frequency amplitude data in a digital form from the first filtered signal, and generating the first representative value based on sampling of the frequency amplitude data in a predetermined time unit.

12. The method of claim 7, wherein determining the hands off of the driver includes: setting the first frequency region and the second frequency region such that the representative value ratio is equal to or greater than the preset threshold.

13. The method of claim 7, wherein determining the hands off of the driver includes: setting the threshold differently based on a travel condition capable of causing a change in a magnitude of an external force applied to a steering wheel by the driver while the driver is gripping the steering wheel.

14. A method for controlling a vehicle, the method comprising:
- passing a torque signal generated by turning of a steering wheel of the vehicle, independently through a first frequency filter and a second frequency filter, to obtain a first filtered signal and a second filtered signal, respectively;
- wherein obtaining the first filtered signal and the second filtered signal includes:
  - using the first frequency filter for filtering a first frequency region, and the second frequency filter for filtering a second frequency region higher than the first frequency region;
- generating a first representative value and a second representative value from the first filtered signal and the second filtered signal, respectively;
- wherein generating the first representative value and the second representative value includes:
  - generating the first representative value using one of a maximum value of a frequency amplitude, an average value of the frequency amplitude, or an absolute value of the frequency amplitude of the first filtered signal;
- determining a hands off of a driver based on a representative value ratio corresponding to a ratio of the first representative value and the second representative value being equal to or greater than a preset threshold; and
- transmitting an alarm based on identification of the hands off of the driver.

* * * * *